UNITED STATES PATENT OFFICE.

JOHN C. HENDERSON, OF OAKLAND, CALIFORNIA.

MANUFACTURE OF ARTIFICIAL STONE.

No. 886,124.  Specification of Letters Patent.  Patented April 28, 1908.

Application filed November 16, 1907. Serial No. 402,481.

*To all whom it may concern:*

Be it known that I, JOHN C. HENDERSON, a citizen of Great Britain, residing at Oakland, in the county of Alameda and State of California, have invented certain new and useful Improvements in the Manufacture of Artificial Stone, of which the following is a specification.

My invention relates to the art of manufacturing artificial stone from Portland cement.

As generally known and practiced the manufacture of artificial stone masses using Portland cement as a binder is conducted in one of three ways; first, by tamping a mass into a non-porous mold; second, by compressing a mass by means of machinery; and, third, by pouring a semi-liquid mass into an absorbent mold. The first of these methods produces a stone which is generally dead in color, has friable arris, and is extremely porous. The second method has the defect of limiting the size of stones which it is practicable to make. The third method produces a stone which is slow to get its strength and which has friable arris. Moreover, by none of these methods is it practical to produce a stone which can be veined in imitation of marble.

As distinguished from the ordinary methods, my invention consists essentially in pouring into a substantially non-porous mold a fluid aqueous mass of Portland cement, either neat or mixed with a fine aggregate such as powdered marble dust, and then, before the initial set of said mass, applying to its top surface dry Portland cement in quantity sufficient to absorb from said mass the excess of water.

Tamping and other mechanically produced compression are thus avoided, while the necessary absorption of the water excess, instead of taking place downwardly, as in a porous mold, takes place upwardly, thereby leaving the bottom of the mold content, which subsequently upon removal becomes the face of the stone, hard and smooth. The upward absorption to the back of the stone, also results in producing a stone from the face of which the excess of alkali has been removed, thus removing the cause of checking and cracking which are always found in work made from neat or too rich cement.

My invention consists also, in connection with this essential feature, of other and additional steps, which I shall hereinafter fully describe, and which result, as a whole, in a stone which is dense and practically impervious to moisture, is not restricted in size, is one which can be veined to imitate marble, is capable of being highly polished, can be made strongly in thin masses, and has extremely strong arris.

These are the objects of my invention, and their attainment will now be readily understood from a full description of my process.

In carrying out my process, the mold, which may be of any suitable form and of proper non-porous or substantially non-porous materials, such as glass, wood or plaster properly treated to render it non-porous, or metal, is first lubricated with any substance or mixture having the necessary slippery properties, and yet not injurious to the material to be molded. Such a lubricant I have found in a mixture of turpentine and a vegetable oil, say, linseed oil, in about equal parts; though this proportion is not absolute, and it may be varied; with, however, a preference for a slight excess of turpentine, which while tending to further diminish any injurious effect which the oil might have on the material, is yet not sufficient to materially reduce the lubricating quality of the mixture. The purpose and effect of this lubrication of the mold are two-fold: first, to enable the mass to be easily removed from the mold, and, second, to provide such a proper surface that the cast of cement will settle and so adjust itself that upon removal, it will be found to be free from blow holes and perfectly smooth. I then take Portland cement, either neat or with the addition of coloring matter, or mixed with a fine aggregate such as powdered marble dust, as may be desired, and mix it with water to an extremely liquid condition, say of about the consistency of milk of lime, so that it is quite fluid; and this I then pour into the mold to a shallow depth, in practice such as will result in the stone having a thickness of about one-eighth of an inch, though this may be varied as desired according to the size of the stone to be made and the purpose for which it is to be used. Before the initial set of this fluid mass takes place, I sprinkle its top surface with dry Portland cement in an amount sufficient to absorb the excess of water contained in the mass, as may be readily determined by the practical worker. The mass is then allowed to remain in the mold until the final set of the cement, when it may be removed and properly seasoned in the manner known to manufacturers of artificial stone. This is the simplest sequence of my process, and while it embodies the essential and necessary step or feature involved in all its variations and additions, to wit, the absorption from above, by the application of the dry Portland cement, of the excess of water from the extremely fluid aqueous mass of Portland cement first poured into the mold, my process contemplates other and further steps, according to the results desired to be obtained. These I shall now describe.

The stone produced as above described, is, as stated, only a thin one. If it be desired to produce a product, such as a floor-tile, the process of pouring the fluid aqueous mass of Portland cement into the mold, and sprinkling its top surface with dry Portland cement is repeated directly upon the first mold content; that is to say, after what may be termed the first mold increment, comprising the fluid mass and the dry cement, is complete, a second fluid aqueous mass of Portland cement is poured upon the first mold content, and the top of said second mass is sprinkled with dry Portland cement, to form a second mold increment like the first, and so on until the aggregate stone is carried to a proper thickness. In this repetition, I find that the several increments, by interabsorption, so consolidate that they cannot be distinguished in the product, but present a single homogeneous stone.

If it be desired to produce a slab of stone, the first completed mass is backed with a proper mixture of concrete, and when set, the slab thus formed is removed from the mold.

If it be desired to vein the face of the stone in any manner to produce ornamental effects, or an imitation of marble, for example, I proceed as follows:—I first make a veining material from Portland cement and color and water, making said material of a little thicker consistency than that of the fluid mass heretofore described. This veining material I then spread in a thin layer in the previously lubricated mold, forming in it veins or cloud effects seen in natural marble. Then I gently pour the fluid aqueous mass of Portland cement, either neat or mixed, as stated, with marble dust, into the mold, without disturbing the tracings or veins of the material used for the veining effects, and I then apply the sprinkling of dry Portland cement, as before. The stone when removed from the mold will present on its face the veinings and cloud effects of the natural marble.

After the stone, formed by my process, is properly cured, say in about thirty days, its surface is treated with a coating of oil, for example, linseed or olive oil, or other slow drying vegetable oil, preferably applied warm. This enters and fills the pores of the cement and not only renders it impervious to water but brightens the color as well.

If it be desired to polish the stone, a coating of wax and turpentine is applied, which can be brushed or rubbed to a brilliant polish.

Having thus described my invention, what I claim as new and desire to secure by Letters Patent is,

1. In the manufacture of artificial stone, the improvement in the method, which consists in first pouring a fluid aqueous mass of Portland cement into a non-porous mold, and then, before the initial set of the mass, applying to its top surface dry Portland cement in quantity sufficient to absorb from the mass the excess of water.

2. In the manufacture of artificial stone, the improvement in the method, which consists in first lubricating a non-porous mold; then pouring into said mold a fluid aqueous mass of Portland cement; and then, before the initial set of the mass, applying to its top surface dry Portland cement in quantity sufficient to absorb from the mass the excess of water.

3. In the manufacture of artificial stone, the improvement in the method, which consists in first pouring a fluid aqueous mass of Portland cement into a non-porous mold; then, before the initial set of the mass, applying to its top surface dry Portland cement in quantity sufficient to absorb from the mass the excess of water; then pouring upon the mold content a second increment of a fluid aqueous mass of Portland cement; then applying to the top surface of the second increment, before its initial set, dry Portland cement in like quantity to the first; and so on to complete the desired thickness of the stone.

4. In the manufacture of artificial stone, the improvement in the method, which consists in first veining in a non-porous mold a fluid aqueous thin coating of colored Portland cement; then pouring upon said veined coating a fluid aqueous mass of Portland cement; and then, before the initial set of the mass, applying to its top surface dry Portland cement in quantity sufficient to absorb from the mass the excess of water.

5. In the manufacture of artificial stone, the improvement in the method, which consists in first applying to a non-porous mold a lubricant; then veining upon said lubricant a fluid aqueous thin coating of colored Portland cement; then pouring upon said veined coating a fluid aqueous mass of Portland cement; and then, before the initial set of the mass, applying to its top surface dry Portland cement in quantity sufficient to absorb from the mass the excess of water.

6. In the manufacture of artificial stone, the improvement in the method, which consists in first pouring a fluid aqueous mass of Portland cement into a non-porous mold;

then, before the initial set of the mass, applying to its top surface dry Portland cement in quantity sufficient to absorb from the mass the excess of water; and then applying to the mold content a backing of concrete.

7. In the manufacture of artificial stone, the improvement in the method, which consists in pouring a fluid aqueous mass of Portland cement into a non-porous mold, and, before the initial set of the mass, applying to its top surface dry Portland cement to absorb from the mass the excess of water, and, finally, when the completed stone is removed from the mold, coating its face which was in contact with the mold, with oil as a filler.

8. In the manufacture of artificial stone, the improvement in the method, which consists in pouring a fluid aqueous mass of Portland cement into a non-porous mold, and, before the initial set of the mass, applying to its top surface dry Portland cement to absorb from the mass the excess of water; then, when the completed stone is removed and cured, coating its face, which was in contact with the mold, with oil as a filler, and, finally, treating said face with turpentine and wax and polishing the same.

In testimony whereof I have signed my name to this specification in the presence of two subscribing witnesses.

JOHN C. HENDERSON.

Witnesses:
 WM. F. BOOTH,
 D. B. RICHARDS.